May 4, 1937.  H. J. DE CREMER  2,079,549
LIQUID COOLING APPARATUS
Filed Aug. 31, 1934  2 Sheets-Sheet 1

Inventor
Henry J. Decremer,
By Edmund H. Parry Jr.
Attorney

May 4, 1937. H. J. DE CREMER 2,079,549
LIQUID COOLING APPARATUS
Filed Aug. 31, 1934 2 Sheets-Sheet 2
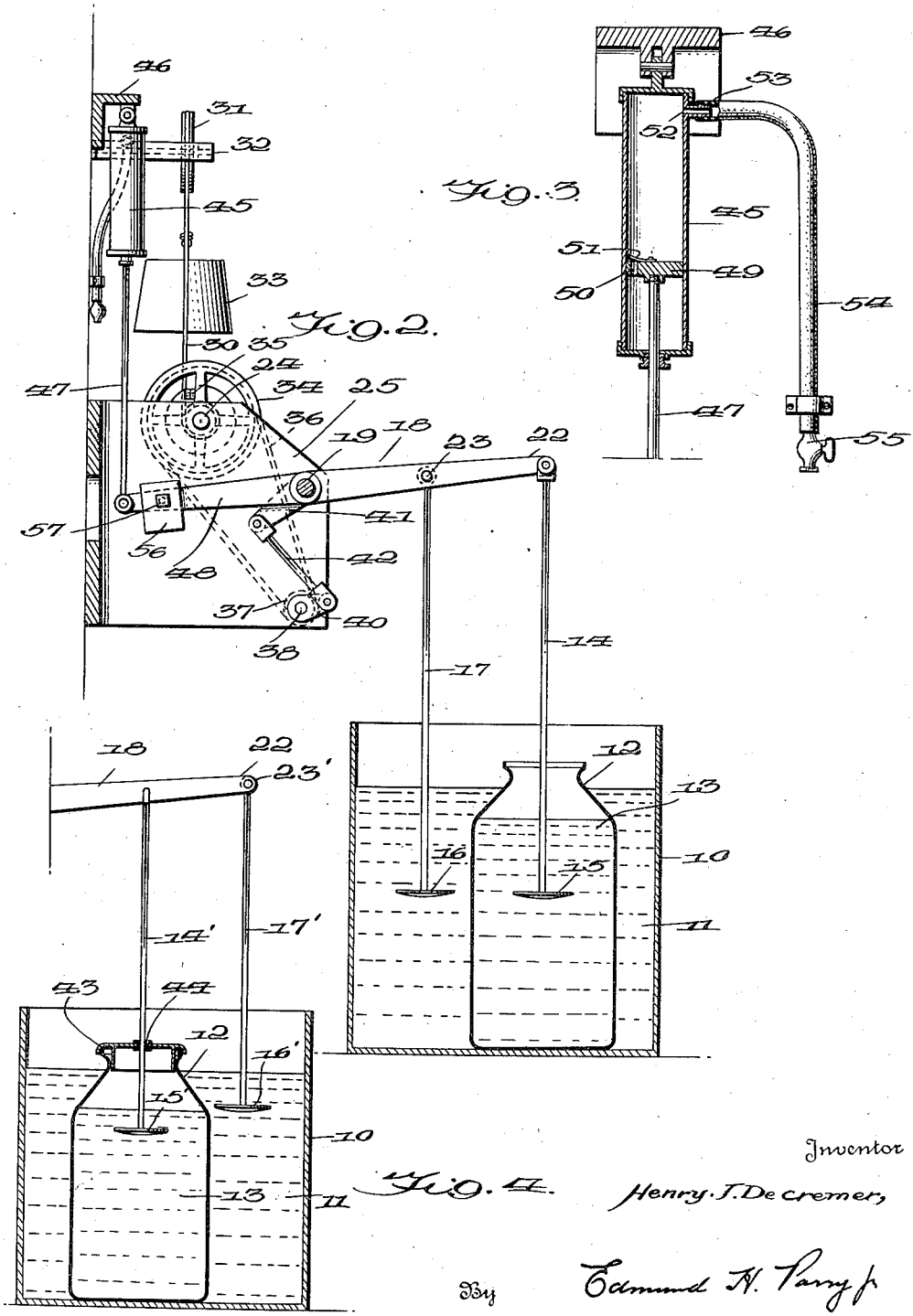
Inventor
Henry J. De cremer,
By Edmund H. Parry jr
Attorney Patented May 4, 1937

2,079,549

UNITED STATES PATENT OFFICE 2,079,549

LIQUID COOLING APPARATUS

Henry J. De Cremer, Green Bay, Wis.

Application August 31, 1934, Serial No. 742,329

11 Claims. (Cl. 257—76)

This invention is directed to apparatus for cooling liquids and concerns particularly a device of such character wherein agitation is employed in an improved manner to bring about rapid and uniform cooling. The invention is adapted to the cooling of various liquids and is particularly useful in the cooling of milk and other liquids which are of such nature that cooling must be carried out with considerable care and under suitable control in order to avoid change in character or quality of the substances.

One object of this invention is to effect the cooling of a liquid by a cooling medium, and to promote rapid and thorough cooling by the simultaneous agitation of both the liquid to be cooled and the cooling medium.

Another object of the invention is to cool liquids in the presence of a surrounding cooling medium with agitation of both bodies, the manner of agitation being such that one of the bodies, preferably the one of large mass, may be agitated to a greater degree than the other so as to promote heat exchange between the liquid to be cooled and the cooling medium.

A further object of my invention is to provide for the cooling of liquids under agitation and to concentrate the agitating force in a particular direction so as to promote continuous circulation of the liquid acted upon about a path and thus insure thorough heat exchange and cooling. In carrying out this object it is proposed specifically as a feature of the invention to employ one or more agitating elements movable through a reciprocatory path and so controlled that the speed of the agitating elements, and hence the agitating force developed, is greater during movement of the elements in one direction on their path than in the other. In an arrangement where both the liquid to be cooled and the cooling medium are to be circulated or stirred such manner of agitation may be beneficially employed for both bodies.

Another object of the invention is to provide for the circulation of liquid in a cooling apparatus by reciprocation of a series of agitating elements and to provide actuating and/or control mechanism so arranged that the speed of the agitators in their reciprocatory path is automatically speeded up and retarded at different parts of the path.

Still further objects and advantages of my invention will become apparent from a consideration and study of the following specification and attached drawings which illustrate a preferred form of the invention and wherein:

Fig. 2 is a cross-sectional view of my liquid cooling apparatus taken on line 2—2 of Fig. 1;

Fig. 3 is an enlarged detail view of the mechanism for controlling and regulating the speed of the agitator members; and Fig. 4 is a detailed view partly in section corresponding to Fig. 2 showing a modified arrangement of the agitators.

Figure 1:
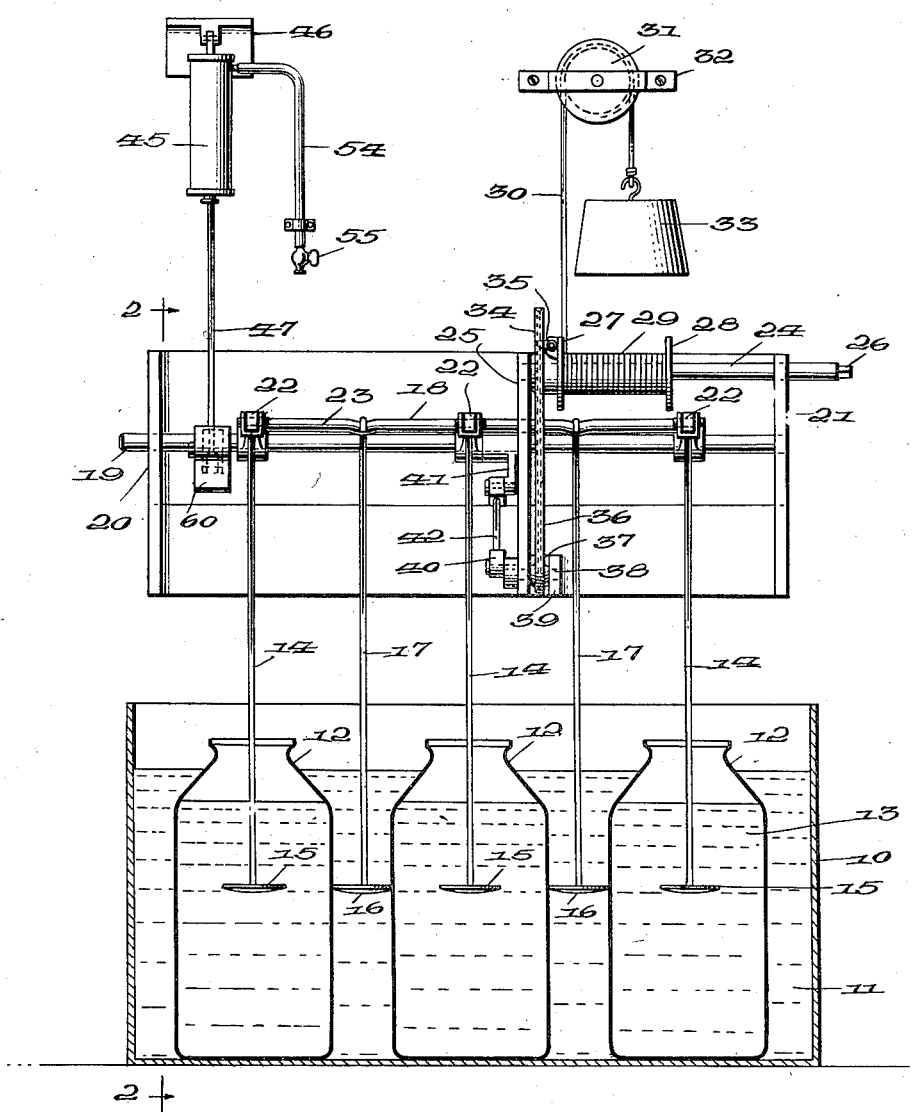
Fig. 1 is a front elevational view of one embodiment of the invention illustrating my liquid cooling apparatus, showing in section the tank for the cooling medium, and receptacles containing the liquid to be cooled, and further illustrating reciprocating agitators for effecting circulation and agitation of the liquid and medium, together with actuating and control mechanism for the agitators.

With reference now to the drawings which illustrate views of one type of apparatus capable of executing my invention, the reference character 10 designates a cooling tank adapted to contain a cooling medium 11 which preferably is water. A plurality of receptacles 12 for holding the liquid 13 to be cooled are shown positioned in the cooling tank and surrounded by the cooling medium.

Both the liquid to be cooled and the cooling medium are subjected to agitation simultaneously inasmuch as circulation of the two masses will promote the exchange of heat one from the other and generally speed up the cooling operation. I therefore suspend from suitable supporting rods 14 a series of agitating elements 15 which elements are so arranged as to project one into each of the receptacles 12 and having a reciprocatory movement to agitate the liquid therein contained. To circulate the cooling medium in the tank additional agitating mechanism is provided, and such mechanism may also be of the reciprocatory type and comprise a set of elements 16 supported by rods 17 of the same type as the agitating members which operate in the receptacles.

The agitating elements 16 are disposed so as to operate in proximity to the various receptacles and insure the circulation of the cooling medium therearound. It will be evident from a comparison of Figures 1 and 2 that the apparatus includes a battery of agitators arranged in sets, one set comprising various agitators 15 and operating in the receptacles and the other set operating in the tank and consisting of the series of elements 16. To conserve space, and more particularly to promote better circulation, the agitators of the respective sets are arranged in offset relation. Conveniently the two sets will be organized in a plurality of rows. It is desirable also that the agitators 15 and the agitators 16 be arranged in staggered relation as shown in Figure 1.

In the embodiment of my invention shown, I obtain a reciprocatory movement of the agitators by securing the supporting rods therefor to a pivoted frame 18 capable of reciprocating up and down. The frame may consist of a rocking shaft 19 mounted in supports 20 and 21, together with a plurality of arms 22 rigidly attached to the shaft and one or more rods 23 carried by the arms. As the shaft 19 is rocked back and forth a reciprocatory movement is imparted to the frame and transmitted to the various agitators supported thereby. All the agitators will thus be simultaneously oscillated in a vertical direction to stir the bodies in the receptacles and tank.

Actuating means is provided operating through the rocking shaft 19 to oscillate the frame. Such means may conveniently take the form of a weight operated motor. Such motor may include, as shown in Figures 1 and 2, a shaft 24 supported for rotary motion by supports 21 and 25 and have one end thereof extending through support 21 and terminating in a squared end 26 adapted to receive a crank. Keyed to shaft 24 are discs 27 and 28 which form therewith a reel 29. A cable 30 has one end secured to the reel and the other end is looped over a pulley 31 mounted in the support 32, and has a weight 33 attached thereto.

It will be seen that when the weight 33 is allowed to fall by gravity that shaft 24 will be rotated by virtue of the same being connected through reel 29 and cable 30 with the weight.

The rotary motion of shaft 24 is utilized to impart a rocking movement to the shaft 19, and to provide for this translation of movement there is loosely mounted upon shaft 24 a pulley wheel 34 the spokes of which are engageable with a latch 35 pivoted to disc 27. Latch 35 functions, when in engagement with the pulley spokes, to connect the driven shaft 24 with pulley 34 and drive the same. Pulley 34 has a V-shaped peripheral kerf to accommodate a V-shaped pulley belt 36 which also fits about a pulley 37 likewise provided with a V-shaped kerf in its periphery. Pulley 37 is keyed to shaft 38 which is rotatably mounted in supports 25 and 39 and has rigid with the end thereof and rotatable therewith as the same is driven through belt 36 and pulley 34 a crank arm 40. Keyed to the shaft 19, which is to be rocked, is a crank arm 41 which connects with crank arm 40 through the medium of a pitman 42. Thus it will be seen that as the gravity motor rotates shaft 24, which in turn through pulley 34, belt 36 and pulley 37 drives shaft 38, the rotary motion thereof through the several crank arms and the pitman is translated into a rocking motion exerted upon shaft 19 with the subsequent reciprocation of the frame and arms 22 and rod 23 together with the sets of agitators 15 and 16. When the weight has reached its lowermost position, and ceases to drive shaft 24, then it will be necessary to release latch 35 from the spokes of pulley 34, freeing the pulley from driving connection with reel 29. A crank then applied to the squared end 26 of shaft 24 can be actuated to rewind the cable upon the reel and so reset the weight in the position shown in Figure 1 ready for operation after the latch 35 is again connected to pulley 34.

It has been found that if the several sets of agitating members have an unequal agitating movement that such differential action can be utilized to further promote the cooling of the desired liquid. Generally the unequal movement of the agitator members is brought about by positioning them upon the reciprocatory frame in such a manner that the set operating in the cooling mechanism and the other set working in the liquid to be cooled will be actuated unequally, one set being moved through a greater reciprocatory path than the other set. This is accomplished by arranging the sets of agitator supporting rods 14 and 17 upon the reciprocating frame at different distances from the rocking shaft 19. By supporting the several sets on the same side of the shaft at unequal distances therefrom the several sets can be arranged to operate in proximity to each other so that the cooling medium will be agitated in the areas thereof immediately surrounding the receptacles containing the liquid to be cooled, and at the same time substantial, though unequal, agitational movement will be imparted to both sets of agitators.

In the embodiment shown in Figures 1 and 2, the arrangement is such that the liquid to be cooled is agitated to a greater degree than the cooling medium. The agitator members 15 stirring the liquid are suspended by their rods 14 adjacent the ends of frame arms 22 remote from the shaft 19. The rods 17 pivotally connect with frame rod 23 to support the agitating members 16 for the cooling medium closer to the rocking shaft with the result that the reciprocatory path of members 16 will be shorter than the path of agitators 15 when the frame is reciprocated.

The arrangement just described may be beneficial with certain types of liquids, but in general it is more desirable to impart the greater amount of agitation to the greater mass, which is usually the cooling medium. Under such circumstances resort may be had to the modified construction shown in Figure 4 which imparts the greater agitation to the cooling medium. Here the agitators 15' operating in the receptacles are supported by their rods 14' at intermediate points on the reciprocating frame arms 22. Frame members 23' are arranged more remote from the frame pivot, being positioned at the ends of arms 22 to suspend the cooling medium agitators 16' through their supporting rods 17' at a greater distance from the frame pivot. Thus the reciprocatory stroke of agitators 16' will be greater than that of agitators 15'.

In Figure 4 I have also shown the receptacles 12 as provided with a closure cap 43 designed to prevent the several masses from mixing, and particularly to prevent loss by splashing of the liquid to be cooled. An aperture is provided in the cover to allow for the passage of the reciprocating rods 14', and to form a close fitting therebetween yet one which will allow for reciprocatory movement of the rod, a bushing 44 of yielding material is provided for the cover aperture.

As a further important feature of the invention, arrangement is made to impel the agitators at different speeds at different phases of their reciprocatory path. The agitators are caused to move at a higher speed during their stroke in one direction than on their opposite stroke for the purpose of obtaining continuous circulation in a uniform manner throughout the entire mass agitated. In this manner all parts of the liquid to be cooled are brought into proximity with the cooling medium, and the exchange of heat between the two bodies is carried out more rapidly. Preferably the upward stroke of the agitators is the more rapid and the downward stroke relatively slow. This produces an upward circulation towards the surface of the liquid and materially aids in cooling the desired liquid by bringing the various parts thereof in contact with the air.

Generally the reciprocating movement of the agitators as above described is accomplished by transmitting the impelling movement of the actuating means at variable speeds to the agitators. This may be brought about by providing, as shown in the illustrated embodiment of my invention, a control mechanism for retarding the motion of the agitators during their stroke in one direction in their reciprocatory path.

Such means may take the form of a dashpot connected to the reciprocating frame, as shown in Figures 1 and 2, wherein 45 designates a cylinder pivotally supported by a bracket 46, and 47 is a piston rod pivotally connected to an extension 48 of one of the reciprocating arms 22 constituting a part of the reciprocating frame. A more detailed construction of the dashpot is shown in Figure 3, and the same includes a piston 49 having a port 50 provided with a flap valve 51 located upon one side of the piston. The upper end of the cylinder is provided with an outlet 52 which includes a fitting 53. A conduit 54 is connected to the outlet terminating in a valved discharge nozzle 55.

During movement of the piston 49 in a downward direction the flap valve will remain open, and under such circumstances the movement of the agitators on their upward stroke will be at the normal speed of their actuating means and free of control of the dash pot. On the upward stroke of the piston 49 the flap valve 51 will close to build up air pressure in the cylinder 45 and retard movement of the agitators during their downward stroke. Thus the agitators will move at a relatively high speed in one direction, operating to agitate the liquid on their upward stroke, and will move at a retarded, slow speed on their other stroke in the opposite direction without causing any considerable agitation.

The dashpot construction is capable of being rendered inoperative to effect a retardation of the agitator members. To effect this the valve 55 connecting with the dashpot through conduit 54 is opened fully so that upon the up stroke of the piston the air exhausts freely and the agitators will move at the same speed on both strokes under actuation of the operating motor. It will be evident also that by adjustment of valve 55 between its fully open and closed positions the retarding effect of the dashpot may be varied to obtain any desired speed differential between the up stroke and down stroke of the reciprocating agitators.

A further means is provided to insure proper and smooth reciprocatory movement of the agitators and also supplement the action of the dashpot in obtaining a better regulation in the speed of the agitators. Such means includes a counterweight 56 shown in Figures 1 and 2, which is mounted upon the extension 48 of frame arm 22 for sliding movement thereon and is securable in any adjusted position by a set screw 57. By adjusting the position of the weight 56 with respect to the frame rocking shaft 19, the speed with which the weight motor drives the agitators is adjusted and the retardation action of the dashpot upon the agitators supplemented.

I claim:

1. A liquid cooling apparatus comprising a tank for holding a cooling medium and adapted to receive receptacles containing the liquid to be cooled, reciprocating agitating members mounted to project into the various receptacles to agitate the liquid to be cooled, and additional agitating members mounted to operate in the tank to agitate the cooling medium, the various agitating members being arranged in sets, and actuating means for the agitators operating to impart a greater agitational movement to one set of members than to the other set.

2. A liquid cooling apparatus comprising a tank for holding a cooling medium and adapted to receive a receptacle containing the liquid to be cooled, a reciprocating agitating member mounted to project into the receptacle and agitate the liquid to be cooled and a further reciprocating agitating member mounted to operate in the tank to agitate the cooling medium, one of said agitating members having a greater reciprocatory traverse than the other so that the cooling medium and liquid to be cooled are unequally agitated, and means for reciprocating the agitating members.

3. A liquid cooling apparatus comprising a tank for holding a cooling medium and adapted to receive receptacles containing the liquid to be cooled, a plurality of reciprocating agitating members some arranged to operate in the cooling medium in the tank and others being located to project into the various receptacles to agitate the liquid to be cooled, a reciprocating frame overlying the tank from which the agitating members are suspended, said frame being pivotally supported for reciprocatory movement in a generally vertical direction, the agitating members being arranged in sets and one set being supported by the frame at a greater distance from the frame pivot than another set so that the members of one set will have a greater reciprocatory stroke and agitational effect than the other set.

4. A liquid cooling apparatus comprising a tank for holding a cooling medium and adapted to receive a plurality of receptacles containing the liquid to be cooled, a pivotally mounted reciprocating frame mounted above the tank, and several sets of agitators suspended from said frame and reciprocating therewith, the agitators of one set extending into the tank to stir the cooling medium and the agitators of the other set being arranged to extend into the several receptacles to stir the liquid to be cooled, said agitators being positioned all on one side of the pivot point of said reciprocating frame with the agitators of one set having a greater reciprocatory traverse and supported by the frame at a greater distance from the pivot point than the other set.

5. An apparatus for cooling liquid comprising a tank for holding a cooling medium and adapted to receive a plurality of receptacles containing the liquid to be cooled, a pivotally mounted reciprocating frame supported above the tank, a battery of agitators carried by said frame and reciprocating therewith, said agitators being positioned all on one side of the pivot point of the frame and arranged in rows located at different distances from the pivot point of the frame, one row of agitators extending into said tank, and agitating the cooling medium therein, and another row of said agitators extending into the receptacles and agitating the liquid to be cooled.

6. An apparatus for cooling liquids comprising a cooling tank, a pivotally mounted frame supported for reciprocatory movement, agitators mounted on said frame and for movement therewith and extending into said tank for agitating the liquid therein, counterbalancing means associated with the frame, and means to actuate said frame and agitators operable to move said agitators in their reciprocatory path at a slower speed in one direction than in the opposite direction.

7. An apparatus for cooling liquids comprising a cooling tank, a frame mounted for reciprocatory movement, agitators operating in the tank, connected to the reciprocating frame, means associated with the frame to counterbalance the agitators, actuating means to reciprocate said frame, and means for retarding the speed of movement of the agitators, said means being operative during movement of the agitators in one direction and inoperative during movement of the agitators in the opposite direction.

8. An apparatus for cooling liquids comprising a cooling tank, a frame mounted for reciprocatory movement, liquid agitators mounted in the frame and means associated with the frame for counterbalancing the agitators, a motor for reciprocating the agitators, and a dashpot connecting with the agitators and operative to retard the speed thereof during movement in one direction in their reciprocatory path.

9. An apparatus for cooling liquids comprising a cooling tank, reciprocating agitators operative in the tank, a pivotally mounted and counterbalanced frame overlying the tank and supporting said agitators, actuating means for reciprocating the frame in a generally vertical direction to move the agitators in their reciprocatory path, and speed retarding means for the agitators comprising a dashpot connecting with the frame operative to retard the speed of the frame during movement thereof in one direction of its traverse.

10. A liquid cooling apparatus comprising a large tank for holding a cooling medium and adapted to receive a row of cans containing the liquid to be cooled, a set of vertically reciprocating agitators suspended in a horizontal row to project downwardly one into each of the cans and circulate the liquid to be cooled, and a further set of vertically reciprocating agitators suspended in another row opposite and close to the first row and projecting downwardly into the tank adjacent the various cans and adapted to work in the area of the cooling liquid immediately surrounding the cans so as to promote the exchange of heat from the liquid to be cooled to the cooling liquid, an oscillating frame located above the tank supporting the agitators of the several rows and adapted to reciprocate the agitators vertically, and motor for actuating the frame.

11. A liquid cooling apparatus comprising a large tank for holding a cooling medium and adapted to receive a row of cans containing liquid to be cooled, a set of vertically reciprocating agitators suspended in a horizontal row to project downwardly one into each of the cans and circulate the liquid to be cooled, and a further set of vertically reciprocating agitators suspended in another horizontal row in staggered relation with the agitators of said first set and projecting downwardly into the tank to work in the cooling liquid immediately surrounding the cans and promote the exchange of heat from the liquid to be cooled to the cooling liquid, a frame located above the tank supporting the agitators of the several rows and adapted to reciprocate the agitators vertically, and motor means for actuating the frame.

HENRY J. DE CREMER.